Oct. 14, 1947.    G. W. BENJAMIN    2,429,117
IDLER ROLLER SUPPORT
Filed Nov. 5, 1945

INVENTOR.
George W. Benjamin
BY
ATTORNEY

Patented Oct. 14, 1947

2,429,117

UNITED STATES PATENT OFFICE 2,429,117

IDLER ROLLER SUPPORT

George W. Benjamin, Birmingham, Ala., assignor to Continental Gin Company, a corporation of Delaware Application November 5, 1945, Serial No. 626,617

2 Claims. (Cl. 198—192)

My invention relates to belt conveyor supporting rolls, more particularly to rolls for supporting belt conveyors of the trough type and has for an object the provision of a device for holding said rolls in assembled relation for shipping.

My invention is particularly related to that type of belt conveyor supporting rolls wherein a plurality of rolls are mounted in brackets in end to end relation to cause the belt to form a trough and has for a particular object the provision of a device whereby such rolls may be assembled at the factory on their supporting brackets and shipped without becoming displaced.

In prior Patent No. 2,285,647, issued to F. E. Deems et al., June 9, 1942, and assigned to Continental Gin Company, there is disclosed and claimed a supporting roll assembly in which the bearings for each roll are held in place at each end by a nut having a downwardly opening socket therein which fits over a bracket having a head fitting into the socket. While not limited thereto, my invention is particularly adapted for association with the supporting rolls therein shown. In accordance with my invention, I provide readily detachable means for cooperating with the supporting nuts at the end of adjacent rolls which hold them in assembled relation. In its broader aspects, my invention contemplated the provision of a detachable device disposed to prevent outward movement of the rolls with respect to their supporting brackets.

Apparatus embodying features of my invention is illustrated in the accompanying drawing, forming a part of this application, in which Fig. 1 is an elevational view of an idler roll assembly embodying features of my invention;

Figure 1:
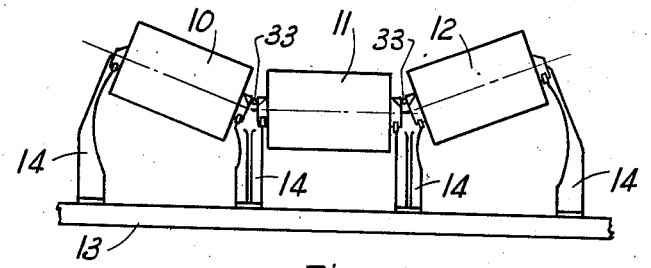

Referring to the drawing for a better understanding of my invention, I show idler rolls 10, 11 and 12, supported from a frame member 13 by a plurality of brackets 14 mounted on the frame member. Each of the rolls comprises a cylinder 16 having dished heads 17 with bearing recesses 18 therein, only one being shown. The bearing recesses 18 are connected by a spacer and grease tube 19 which extends the length of each roll. Extending through the roll is a shaft 22. Surrounding the shaft 22, near each end thereof and positioned in the bearing recesses 18 are anti-friction bearings. The shaft is threaded at its ends and screwed on to each end is an adjusting and supporting nut 23 which serves to hold the anti-friction bearings in place and to support the rolls. The end of the shaft 22 is provided with a kerf 24 into which a tool may be inserted through the open end of the nut 23 to position the nut on the shaft.

Figure 3:
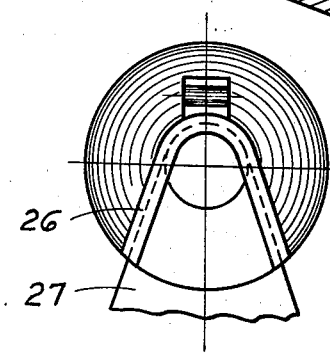
Fig. 3 is an end view of one of the main supporting nuts.
Figure 4:
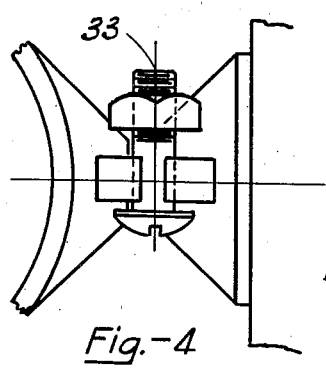
Fig. 4 is a fragmentary plan view showing the means for holding the rolls in assembled relation in position.

In the outer end of each of the nuts 23 there is provided a downwardly opening diverging socket 26 which is somewhat in the shape of an inverted U, as seen in Fig. 3. Formed integrally with each of the supporting brackets 14 is a head 27 of a shape corresponding to the socket 26. The socket 26 fits snugly over the head 27 on its associated supporting bracket 14. It will be seen with the arrangement just described that the idler rolls may be mounted on their supporting brackets by the simple operation of fitting the socket 26 over the heads 27. The socket 26 has a flange 28 along the sides and at the top which engages the head 27 whereby the rolls are held against endwise tilting movement and may be removed from the brackets only by a movement parallel with said flanges and normal to the longitudinal axes of said rolls. The structure so far described is that shown and claimed in the Deems et al. patent aforesaid, and forms no part of my invention.

Figure 2:
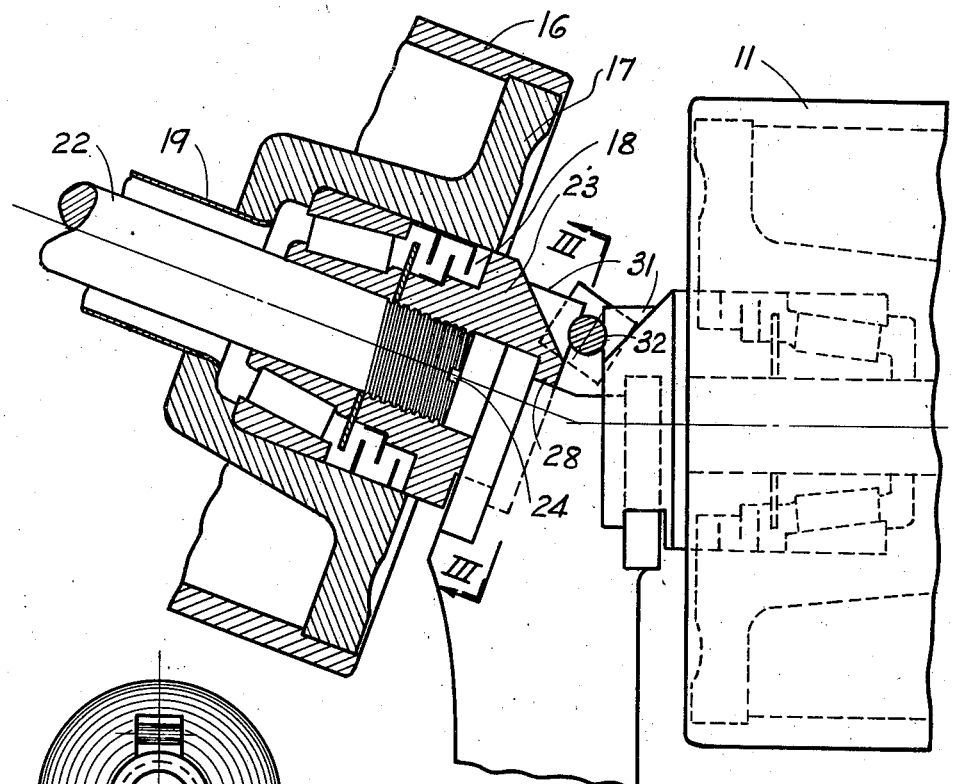
Fig. 2 is a view partly in section and partly in elevation showing the bearing supporting nut in detail mounted on their supporting brackets.

In accordance with my invention, I provide each of the nuts 23 with an outwardly projecting lug 31. When the rolls are mounted on their supporting brackets, the adjacent lugs 31, as shown in Fig. 2, lie close together. In order to prevent accidental disassembly of the rolls, I provide each of the lugs 31 with a recess 32 and insert between the lugs a short bolt 33 with its sides bearing in the recesses. Inasmuch as the rolls are angularly disposed with respect to each other, it will be seen that there can be no outward movement of the rolls without first removing the bolts 33. It will furthermore be seen that the rolls being angularly disposed with respect to each other and being held against tilting movement by the flanges 28, no retaining means are required for the outer ends of the rolls 10 and 12. By this simple expedient, the rolls may be assembled on their supporting brackets and shipped without danger of becoming disassembled.

From the foregoing, it will be apparent that I have devised an improved retaining means for belt conveyor supporting rolls which is simple of design and readily attached and detached from the rolls.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In an idler roll assembly for a troughing belt conveyor in which the idler rolls are mounted in end to end relation and are angularly disposed with respect to each other, mounting brackets for the rolls, supporting members for each roll detachably mounted on the brackets, the intermediate supporting members for adjacent rolls being in relatively closely spaced side by side relation, a lug on each supporting member having a recess therein facing the supporting member for an adjacent roll, and a bolt interposed between the adjacent supporting members and engaged in said recesses.

2. In an idler roll assembly for a troughing belt conveyor in which the idler rolls are mounted in end to end relation and are angularly disposed with respect to each other, mounting brackets for the rolls, a tapered head on each bracket, supporting members for the rolls having sockets therein fitting over the tapered heads and movable on said heads only in a direction normal to the long axes of the rolls, a lug on each supporting member intermediate the ends of the assembly having a recess therein facing the supporting member for an adjacent roll, and a bolt interposed between the adjacent supporting members and engaged in said recesses.

GEO. W. BENJAMIN.

REFERENCES CITED

The following references are of record in the file of this patent:

UNITED STATES PATENTS

| Number | Name | Date |
|---|---|---|
| 1,709,152 | Pos et al. | Apr. 16, 1929 |
| 2,285,647 | Deems et al. | June 9, 1942 |